United States Patent [19]

Chiles

[11] 4,281,644

[45] Aug. 4, 1981

[54] SOLAR COOKER

[75] Inventor: William B. Chiles, Marina del Rey, Calif.

[73] Assignee: Solar Bar-B-Que Corporation, Los Angeles, Calif.

[21] Appl. No.: 47,903

[22] Filed: Jun. 12, 1979

[51] Int. Cl.³ .................................................. F24J 3/02
[52] U.S. Cl. ...................................... 126/451; 126/438
[58] Field of Search ............... 126/451, 450, 438, 439, 126/417, 901

[56] References Cited

U.S. PATENT DOCUMENTS

| 2,909,171 | 10/1959 | Löf ....................................... 126/451 |
| 2,998,002 | 8/1961 | Standig ............................. 126/451 X |
| 3,236,227 | 2/1966 | Steinberg ............................. 126/451 |
| 4,083,357 | 4/1978 | Fischer ................................. 126/451 |
| 4,196,721 | 4/1980 | Posnansky ............................. 126/451 |

FOREIGN PATENT DOCUMENTS 2332506  6/1977  France ..................................... 126/451

Primary Examiner—James C. Yeung
Assistant Examiner—Larry Jones
Attorney, Agent, or Firm—Harvey B. Jacobson

[57] ABSTRACT

A pair of open sided housing halves including corresponding closed and open sides as well as corresponding sets of peripheral sides extending about major portions of the closed sides and extending toward and bounding corresponding major portions of the open sides are provided. Pivot structure pivotally couples corresponding peripheral sides of the halves together for relative of swinging of halves between closed closely juxtaposed positions opening into each other and open positions opening in generally the same direction. The inner surfaces of the closed sides of the housing halves are contoured, other than a parabolic contour, to reflect sunlight, incident thereon from the aforementioned direction, in a concentrated manner into a zone centrally spaced, in the aforementioned direction, outwardly of the open sides of the housing halves and a pair of support arms are provided including base and free ends. The base ends and the housing halves, adjacent the pivot structure, include coacting recess and projection structure telescopingly engaged with each other for removable support of the base ends of the arms from the housing halves at opposite sides thereof spaced along a path closely paralleling the axis of relative swinging of the housing halves and with the free ends of the arms disposed at opposite ends of a second elongated zone substantially coinciding with the first mentioned zone.

9 Claims, 8 Drawing Figures

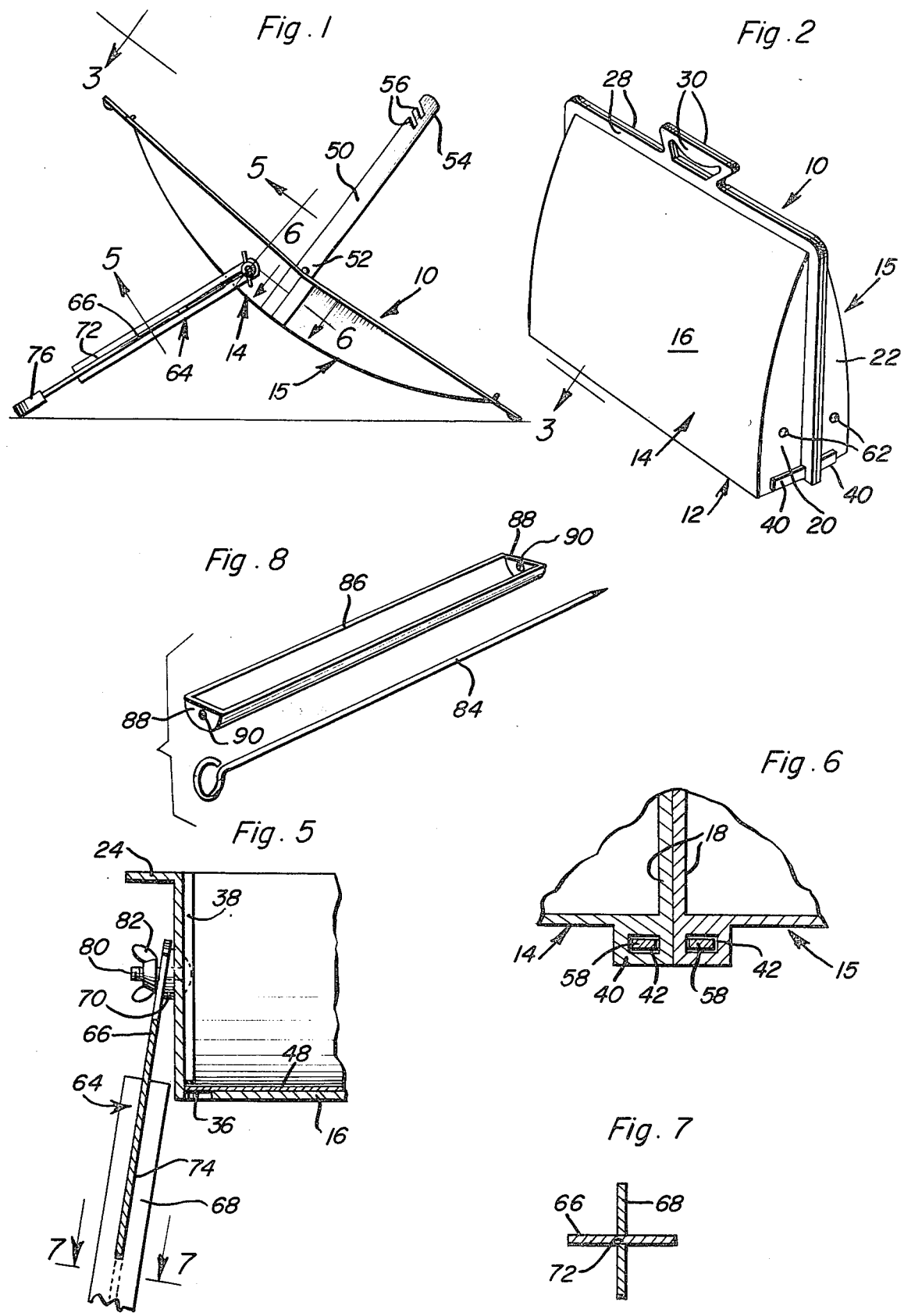

SOLAR COOKER

BACKGROUND OF THE INVENTION

Various forms of collapsible solar cookers have been heretofore provided, but none are constructed in the manner of a briefcase-type of structure comprising two halves which may be pivoted approximately 180 degrees relative to each other from closed positions opening into each other to operative open positions opening in substantially the same direction. By such construction, a solar cooker may be readily carried in the manner of a conventional briefcase and yet may be readily opened for substantially instant operation.

Various forms of solar cookers, heaters and collectors including some of the general structural and operational features of the instant invention are disclosed in U.S. Pat. Nos. 2,859,745, 2,998,022, 3,463,577, 3,990,914 and 4,083,357. However, these cookers, heaters and heat collectors are not constructed in a manner whereby they may be utilized as self-contained solar cookers and yet may be readily collapsed for transport as well as readily unfolded for substantially instant use and also afford extra storage area for receiving various hardware and food supplies.

BRIEF DESCRIPTION OF THE INVENTION

The solar cooker comprises a pair of housing halves including closed and open sides and with peripheral sides bounding each open side. One pair of peripheral sides are pivotally joined together for movement of the housing halves between tightly closed positions opening into each other and open positions opening in substantially the same direction. The inner surfaces of the closed sides of the housing halves are contoured to reflect sunlight incident thereon from the aforementioned direction in a concentrated manner into a zone spaced centrally outwardly of the open sides of the housing halves. Removably supported arm structure is provided for support from the housing halves and includes free ends projecting outwardly from the housing halves in the aforementioned direction and with their free ends disposed at opposite ends of a second elongated zone substantially coinciding with the aforementioned zone.

The main object of this invention is to provide a solar cooker which may be readily transported in a compact state and yet which may be readily erected into an operational state.

Another object of this invention is to provide a solar cooker of lightweight construction.

Still another object of this invention is to provide a solar cooker with light reflective surfaces thereof which may be readily replaced when the light reflective surfaces become soiled.

A further object of this invention is to provide a solar cooker including support legs therefor which may be readily adjusted in order that the solar cooker may be most advantageously positioned relative to the direction from which the sun is incident upon the solar cooker.

Still another object of this invention is to provide a solar cooker comprising a completely self-contained unit.

Another object of this invention is to provide a cooker unit constructed in a manner whereby foods to be cooked or other desired items may be stored and/or transported within the unit.

A further object of this invention is to provide a solar cooker with removable and washable light reflective surfaces.

Still another object of this invention is to provide a solar cooker with an adjustable heat range, i.e., by inverting the Mylar reflective material, heat is reduced by approximately 30% for extremely hot weather cooking.

Still another object of this invention is to provide a solar cooker that can be precisely aimed to prevent the spit supports casting a shadow.

A final object of this invention to be specifically enumerated herein is to provide a solar cooker in accordance with the preceding objects and which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the cooker in an open operative position;

FIG. 2 is a perspective view of the cooker in a closed position;

FIG. 5 is an enlarged fragmentary sectional view taken substantially upon the section line 3—3 of FIG. 1;

FIG. 6 is an enlarged fragmentary sectional view taken substantially upon the section line 6—6 of FIG. 1;

FIG. 7 is an enlarged fragmentary sectional view taken substantially upon the section line 7—7 of FIG. 5; and FIG. 8 is an exploded perspective view of an accessory for the cooker.

DETAILED DESCRIPTION OF THE INVENTION

Figure 3:
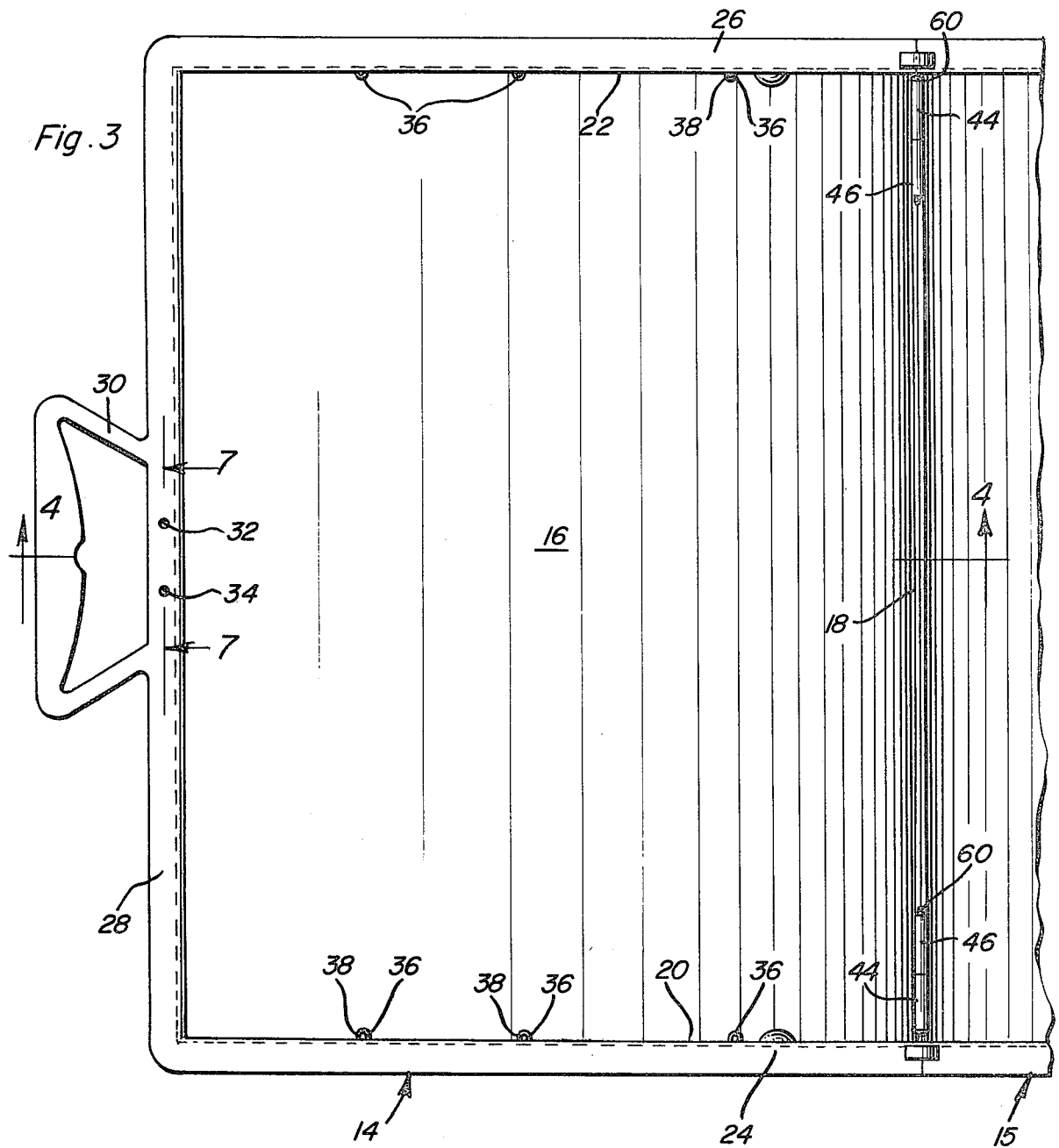
FIG. 3 is an enlarged fragmentary plan view as seen from the section line 3—3 of FIG. 1.
Figure 4:
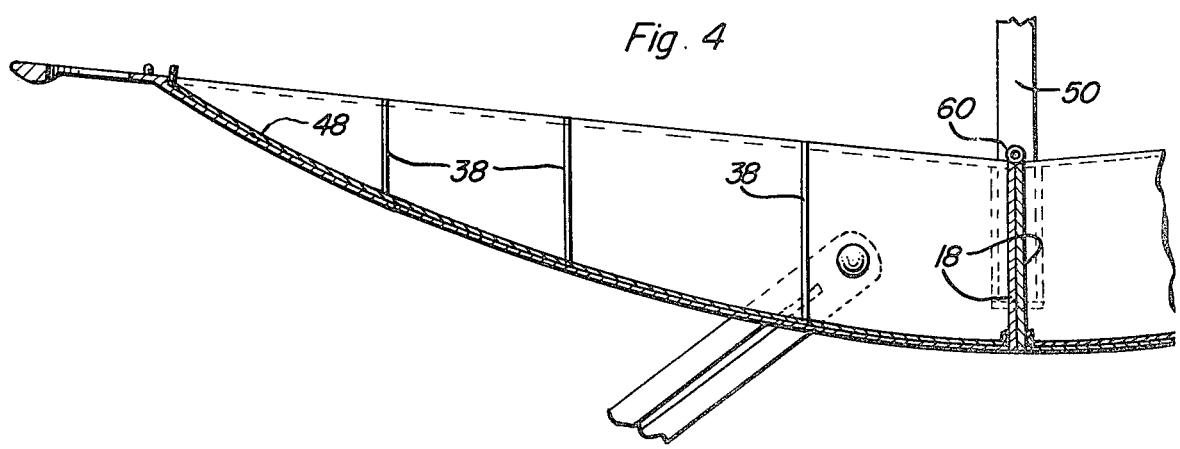
FIG. 4 is a fragmentary vertical sectional view taken substantially upon the section line 4—4 of FIG. 3.

Referring now more specifically to the drawings, the numeral 10 generally designates the solar cooker of the instant invention. The solar cooker 10 includes a housing or case referred to in general by the reference numeral 12 comprising a pair of housing halves 14 and 15 which are identical in construction and which may therefore be made from the same mold by molding processes. Further, it is preferable that the housing halves 14 and 15 be constructed of lightweight but impact resistant plastic material.

Referring now more specifically to FIGS. 3–6 of the drawings, it may be seen that the housing half 14 includes a closed side 16, a base peripheral side 18 extending along one marginal portion of the closed side 16 and a pair of adjacent adjoining peripheral sides 20 and 22 extending away from opposite ends of the base side 18 along the corresponding marginal portions of the closed side 16. The peripheral sides 20 and 22 include right angle flanges 24 and 26 along their free marginal edges and the flanges 24 and 26 are substantially coplanar. In addition, the closed side 16 curves toward and the adjacent peripheral sides 20 and 22 taper toward a similar flange 28 extending along the marginal edge of the side of the closed side 16 remote from the base peripheral side 18. The flange 28 is coplanar with the flanges 22 and 24 and an integral molded handle 30 projects outwardly from the midportion of the flange 18.

Flange 28 extends between corresponding ends of the flanges 22 and 24 and the mid-portion of the flange 28 includes a small diameter bore 32 formed therethrough on one side of the longitudinal mid-portion of flange 28 and a projection 34 on the other side of the longitudinal mid-portion of the flange 38, see FIGS. 3 and 7. Also, the marginal portions of the closed side 16 extending along the peripheral sides 20 and 22 include small diameter openings 36 formed therethrough adjacent the peripheral sides 20 and 22 and the sides 20 and 22 include outstanding ribs 38 carried by the inner surfaces thereof and extending from the flanges 24 and 26 toward and terminating at points spaced slightly from the inner surface of the closed side 16.

The opposite ends of the base marginal sides 18, at their junctures with the adjacent ends of the peripheral sides 20 and 22, include enlarged reinforcing bosses 40 having outwardly opening recesses 42 formed therein opening outwardly through the flanges 24 and 26 toward the open side of the housing half 14.

The housing half 14 further includes integral hinged barrels 44 and 46 carried by opposite end portions of the base peripheral side 18 and it will be noted that the hinged barrel 46 is spaced inwardly from the flange 26 a distance sufficient to receive the hinged barrel 44 of the housing half 15 between the hinged barrel 46 and the flange 26.

A sheet 48 of Mylar film is disposed in overlying engagement with the inner surface of each closed side 16 and the sheets 48 include opposite sides thereof which are covered with light reflective coatings of different degrees of reflectivity. Further, the sheets 48 readily conform to the arcuate contour of the closed sides 16 and those marginal portions of the sheets 16 extending along the inner surfaces of the peripheral sides 20 and 22 are received beneath the ends of the ribs 38 spaced slightly from the inner surfaces of the closed sides 16. The sheets 48 may, of course, be replaced, turned over, or cleaned whenever desired.

With attention now invited more specifically to FIGS. 1, 3, 4 and 5 of the drawings, a pair of elongated bar-type support arms 50 are provided and include base and free ends 52 and 54. The free ends 54 are provided with longitudinally spaced laterally opening notches 56 and each base end 52 is forked and defines a pair of spaced parallel tines 58 snugly telescopingly and removably received within a corresponding pair of recesses or sockets 42. In this manner, the support arms 50 are securely supported in position projecting in the direction in which the open sides of the housing halves 14 and 15 face, one housing halves are in their open positions and the innerlocking engagement of the tines 58 and the recesses or sockets 42 lock the housing halves 14 and 15 against relative slinging from the open positions thereof illustrated in FIG. 1 to the closed positions thereof illustrated in FIG. 2, a hinge pin 60 being passed through each pair of axially abutting and aligned hinged barrels 44 and 46 for hingedly securing the housing halves 14 and 15 together for relative swinging between the open and closed positions thereof illustrated in FIGS. 1 and 2.

When the housing halves 14 and 15 are swung to their closed positions, corresponding flanges 24, 26 and 28 are disposed in surface-to-surface abutting engagement with each other and each projection 34 is received through a corresponding bore 32. Further, the adjacent sides of the handles 30 are disposed in juxtaposed abutting relation to define a single carrying handle.

With attention now invited more specifically to FIGS. 2, 3, 4 and 5 of the drawings, it will be seen that each of the peripheral sides 20 and 22 includes a bore 62 formed therethrough. Also, two leg assemblies referred to in general by reference numeral 64 are provided and each leg assembly 64 includes oppositely longitudinally slotted and interfitted upper and lower leg sections 66 and 68. The upper end of each upper leg section 66 is provided with an apertured wedge-shaped mounting boss 70 and the leg section 66 is longitudinally slotted as at 72. Each lower leg section is longitudinally slotted as at 74 and includes an enlarged foot portion 76 on its lower end. The boss equipped end of each upper section is removably pivotally secured to a corresponding side peripheral wall 20, or 22 by means of a molded in threaded bolt 80 and a companion wing nut 82, each threaded bolt 80 being passed through the corresponding aperture or bore 62 and the apertured wedge-shaped mounting boss 70. In this manner, the upper leg sections 6 are splayed outwardly from opposite sides of the cooker 10. Accordingly, it may be seen that the cooker 10 may be supported in an advantageous position to receive sunlight incident thereon from the direction in which the housing halves 14 and 15 open when the cooker 10 is in the open operative position.

A suitable spit 84, see FIG. 8, may be supported from a selected pair of corresponding notches 56 and the curvature of the inner surfaces of the closed sides 16 is such that the sun incident upon the open cooker 10 may be reflected in a concentrated manner from the sheets 48 into a zone extending between the free ends 54 of the support arms 50. Further, from FIG. 4 of the drawings, it may be seen that the adjacent portions of the inner surfaces of the closed sides 16 are substantially coextensive.

It is again stressed that the housing halves 14 and 15 are identically constructed and that they may therefore be formed in the same mold. Although the lightweight impact resistant plastic may be utilized to form the major components of the cooker 10 except for the Mylar form sheets 48, other suitable materials may also be utilized.

It is pointed out that the support arms 50 as well as the leg assemblies 64 may be disengaged from the housing halves 14 and 15 and received within the cooker 10 when the latter is in its closed position as illustrated in FIG. 2. Accordingly, it may be seen that the cooker may be readily collapsed as well as readily unfolded from a closed position into a fully operative position.

With attention again invited to FIG. 8, there may be seen a semicylindrical receptacle 86 including end walls 88 having aligned bores 90 formed therethrough. The spit 84 may be inserted through the bores 90 and has its opposite ends supported from a selected pair of notches 56. In this manner, soup or other liquids may be heated in the receptacle. Also, roll formed foods such as ground beef may be cooked in the receptacle 86.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A collapsible solar cooker including a pair of open sided housing halves including corresponding closed and open sides as well as corresponding sets of peripheral sides extending about major portions of said closed sides and extending toward and bounding corresponding major portions of said open side, pivot means pivotally coupling corresponding peripheral sides of said halves for relative swinging of said halves between closed closely juxtaposed positions opening into each other and open positions opening in generally the same direction, the inner surfaces of said closed sides being contoured to reflect sunlight incident thereon from said direction in a concentrated manner into a zone centrally spaced, in said direction, outwardly of said open sides, a pair of support arms having base ends and free ends, said base ends and said halves adjacent said pivot means including coacting recess and projection means telescopingly engaged with each other for removable support of said base ends from said halves at opposite sides of said cooker along a path closely paralleling the pivot axis of relative swinging of said halves and with said free ends of said arms projecting in said direction, said free ends being disposed in opposite ends of a zone substantially coinciding with the first mentioned zone, and an elongated spit removably supported from and extending between said free ends.

2. The combination of claim 1 wherein said housing halves are generally parallelepiped in plan shape, said peripheral sides of each of said halves comprising adjoining sides extending about three adjacent sides of the four sides, the peripheral sides of each of said halves including a base peripheral side and a pair of adjoining adjacent peripheral sides, said base peripheral sides being pivotally joined together by said pivot means.

3. The combination of claim 2 wherein each closed side curves and the pair of corresponding adjacent peripheral sides taper toward the fourth side of the corresponding half opposite the base side thereof.

4. The combination of claim 1 including removable reflective sheet means overlying the inner surfaces of said closed sides.

5. The combination of claim 1 wherein said closed sides are arcuate and substantially coextensive.

6. A collapsible solar cooker including a pair of open sided housing halves including corresponding closed and open sides as well as corresponding sets of peripheral sides extending about major portions of said closed sides and extending toward and bounding corresponding major portions of said open side, pivot means pivotally coupling corresponding peripheral sides of said halves for relative swinging of said halves between closed closely juxtaposed positions opening into each other and open positions opening in generally the same direction, the inner surfaces of said closed sides being contoured to reflect sunlight incident thereon from said direction in a concentrated manner into a zone centrally spaced, in said direction, outwardly of said open sides, a pair of support arms having one pair of base ends removably supported from said cooker and free ends disposed adjacent the opposite ends of said zone, and an elongated spit removably supported from and extending between said free ends.

7. The combination of claim 6 wherein said closed and peripheral sides fully close the interior of said cooker from the exterior thereof when said halves are in said closed juxtaposed positions.

8. The combination of claim 6 including an elongated open sided trough having closed ends, said closed ends being removably supported from opposite end portions of said spit with said trough extending along said spit and opening away from said base ends.

9. A collapsible solar cooker including a pair of open sided housing halves including corresponding closed and open sides as well as corresponding sets of peripheral sides extending about major portions of said closed sides and extending toward and bounding corresponding major portions of said open side, pivot means pivotally coupling corresponding peripheral sides of said halves for relative swinging of said halves between closed closely juxtaposed positions opening into each other and open positions opening in generally the same direction, the inner surfaces of said closed sides being contoured to reflect sunlight incident thereon from said direction in a concentrated manner into a zone centrally spaced, in said direction, outwardly of said open sides, said housing halves being generally parallelepiped in plan shape, said peripheral sides of each of said halves comprising adjoining sides extending about three adjacent sides of the four sides, the peripheral sides of each of said halves including a base peripheral side and a pair of adjoining adjacent peripheral sides, said base peripheral sides being pivotally joined together by said pivot means, a pair of support arms having base ends and free ends, said base ends and said halves adjacent said pivot means including coacting recess and projection means telescopingly engaged with each other for removable support of said base ends from said halves at opposite sides of said cooker along a path closely paralleling the pivot axis of relative swinging of said halves and with said free ends of said arms projecting in said direction, said free ends being disposed in opposite ends of a zone substantially coinciding with the first mentioned zone, said base sides each, at opposite ends thereof, defining outwardly opening sockets opening in said direction, corresponding sockets of said housing being closely spaced apart, said base ends of said support arms being forked and defining a pair of side-by-side tines removably telescoped in said sockets and latching said halves in the open positions against relative swinging toward the closed positions.

* * * * *